United States Patent [19]
Ma

[11] Patent Number: 5,260,885
[45] Date of Patent: Nov. 9, 1993

[54] SOLAR POWER OPERATED COMPUTER

[76] Inventor: Hsi-Kuang Ma, 4F, No. 48, Sec. 2, Chung Cherng Road, Taipei, Taiwan

[21] Appl. No.: 894,339

[22] Filed: Jun. 4, 1992

[30] Foreign Application Priority Data

Aug. 31, 1991 [CN] China ................................. 91224287

[51] Int. Cl.$^5$ ...................... G06F 1/00; H01L 31/045
[52] U.S. Cl. .................................. 364/708.1; 136/245; 136/291; 361/681
[58] Field of Search .................. 136/245, 291; 364/708

[56] References Cited

U.S. PATENT DOCUMENTS 5,039,928  8/1991  Nishi et al. .............................. 320/2

Primary Examiner—Aaron Weisstuch
Attorney, Agent, or Firm—Bacon & Thomas

[57] ABSTRACT

A solar power operated computer comprised of an upper casing and a base pivoted together, the upper casing and the base each having a solar cell assembly respectively hinged thereto to collect the radiant energy of sunlight and convert it into electric power for charging respective storage batteries. The upper casing with its solar cell assembly may be detached from the base for independent use as a touch-control type or pen base computer.

5 Claims, 3 Drawing Sheets

SOLAR POWER OPERATED COMPUTER

BACKGROUND OF THE INVENTION

The present invention relates to computers and relates more particularly to a solar power operated computer.

A variety of personal computers are known and widely in use. In recent years, notebook computers have been widely accepted by businessmen because of the advantage of high mobility. However, a battery case with storage battery must be provided when a notebook computer is to be used outdoors or away a source of mains power. Even if a battery case with storage battery is provided, it can only provide a notebook computer with the required working voltage for a limited length of time, and must be recharged when discharged.

SUMMARY OF THE INVENTION

The present invention has been accomplished to eliminate the aforesaid disadvantages. According to one aspect of the present invention, a solar power operated computer is generally comprised of an upper casing detachably pivoted to a base, wherein the upper casing and the base each have a solar cell assembly respectively pivoted thereto and used to collect the radiant energy of sunlight and convert it into electric power for charging respective storage batteries. According to another aspect of the present invention, the upper casing with the solar cell assembly thereof may be detached from the base for independent use as a touch-control type or pen base type computer independently.

DETAILED DESCRIPTION OF THE PREFERRED EMBODIMENT

Figure 1:
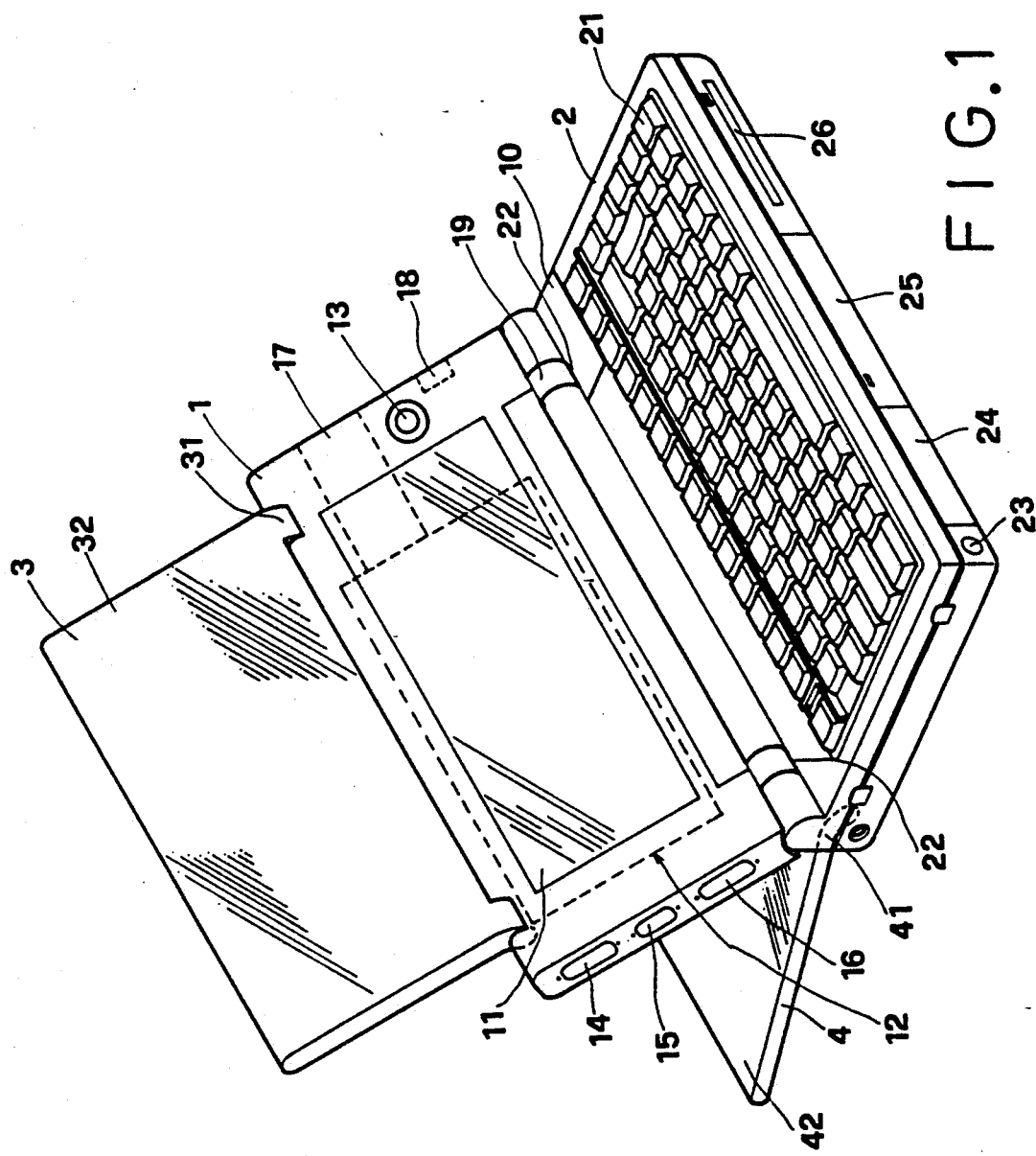
FIG. 1 is a perspective view of the preferred embodiment of the solar power operated computer showing the computer opened into an operative position.
Figure 2:
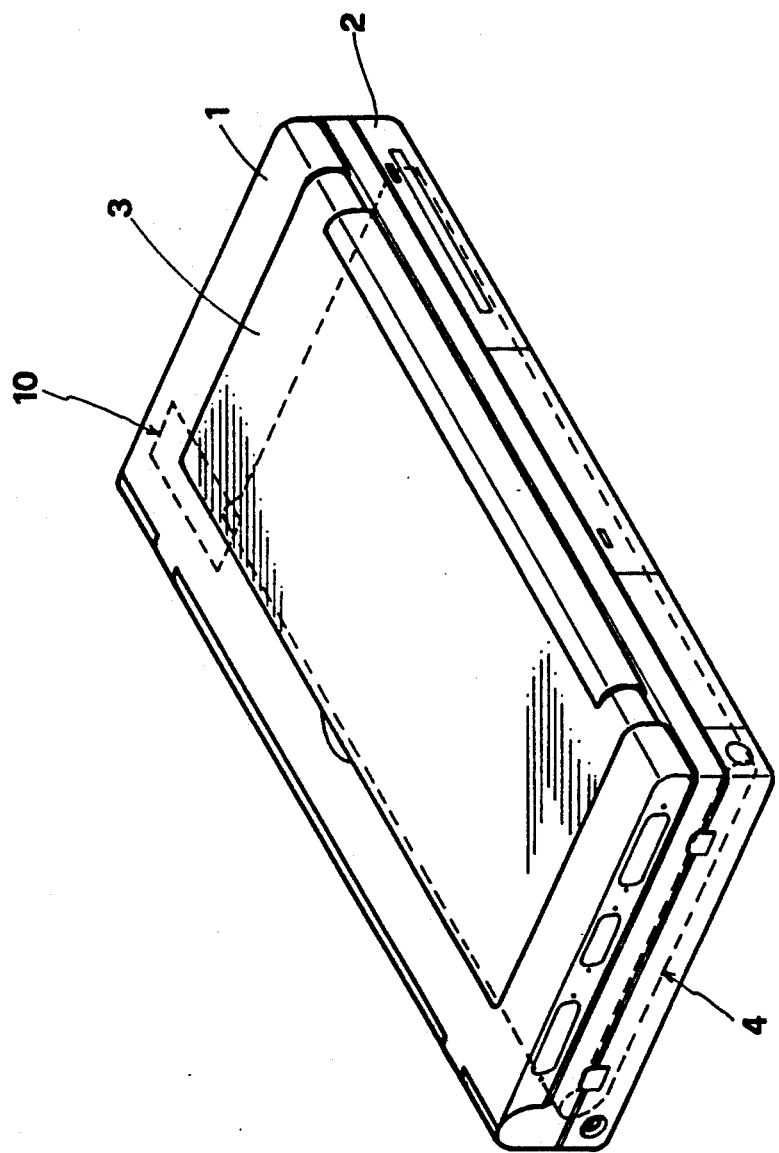
FIG. 2 is an elevational view of the solar power operated computer when closed.

Referring to FIGS. 1 and 2, the preferred embodiment of the present invention is generally comprised of an upper casing 1, a base 2, an upper solar cell assembly 3, and a lower solar cell assembly 4. The upper casing 1 may be independently used or incorporated with the base 2 into a mobile computer. The upper casing 1 comprises a display 11, a mother board 12 (on the inside below the display 11), an optical mouse 13, a printer output port 14, a serial I/O interface 15, a display output port 16, an IC card 17, a keyboard adapter 18, two male (female) connectors 19 for connecting the base 2, and a storage battery 10. The base 2 is comprised of a keyboard 21, two female (male) connectors 22 detachably connected to the two male (female) connectors 19, an AC-DC power supply selector 23, a storage battery 24, a hard diskdrive 25, and a floppy diskdrive 26. Once the upper casing 1 and the base 2 have been connected together, the keyboard 21, the hard diskdrive 25, and the floppy diskdrive 26 are electrically connected to the mother board 12 and the display 11 for operation. The upper solar cell assembly 3 is made in the shape of a smooth, flat board covered with a transparent protective layer 32, and pivoted to the upper casing 1 at one side opposite to the base 2 by hinges 31. The upper solar cell assembly 3 converts the radiant energy of sunlight into electric power used in charging the storage battery 10 through a concealed electric circuit (not shown). The lower solar cell assembly 4 is also made in the shape of a smooth, flat board covered with a transparent protective layer 42 and pivoted to the base 2 at one side. Electric power from the lower solar cell assembly 4 is connected to the storage battery 24 of the base 2 by a concealed electric circuit (not shown).

Figure 3:
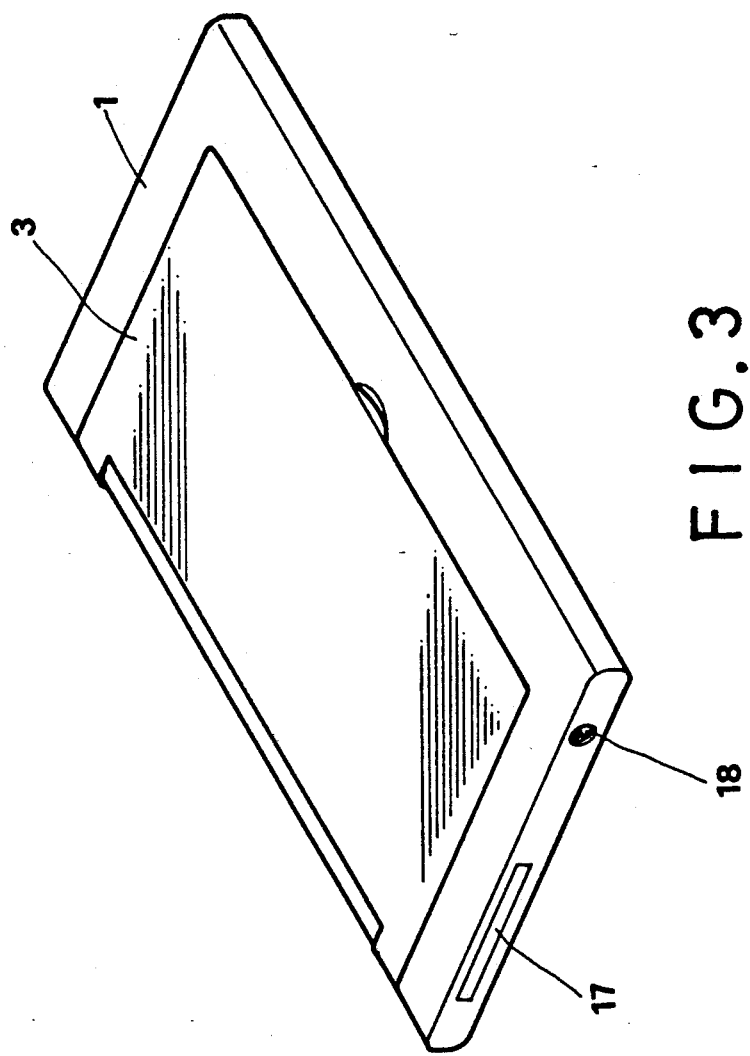
FIG. 3 is an elevational view of the upper body.

Referring to FIG. 3, the upper casing 1 may be detached from the base 2 for independent use, with electric power supply provided by the upper solar cell assembly 3.

Referring to FIG. 2 again, the upper casing 1, the base 2, the upper solar cell assembly 3 and the lower solar cell assembly 4 may be closed together for carrying. While carrying, the upper and lower solar cell assemblies 3, 4 keep collecting the radiant energy of sunlight and converting it into electric power in charging the storage batteries 10, 24 respectively. Even when the computer is set down in a place, the solar cell assembly which is exposed to sunlight keeps collecting the radiant energy of sunlight and converting it into electric power.

Referring to FIG. 1 again, when in use, the lower solar cell assembly 4 and the upper casing 1 are respectively opened from the base 2, and the upper solar cell assembly 3 is opened from the upper casing 1. While operating, the upper and lower solar cell assemblies 3,4 keep collecting the radiant energy of sunlight and converting it into electric power.

Referring to FIG. 2 again, when the upper casing 1 has been detached from the base 2 for independent use, the upper solar cell assembly 3 is still connected to the upper casing 1 to provide it with necessary electric power.

What is claimed is:

1. A solar power operated computer comprising an upper casing pivoted to a base with electric circuits connected therebetween, wherein said upper casing has a first solar cell assembly hinged thereto and electrically connected to a storage battery therein; and said base has a second solar cell hinged thereto and electrically connected to a storage battery therein.

2. The solar power operated computer according to claim 1, wherein said upper casing and said first solar cell assembly can be detached from said base for independent operation.

3. The solar power operated computer according to claim 1, wherein said upper casing comprises a touch control display.

4. The solar power operated computer according to claim 1, wherein said upper casing comprises a pen base display.

5. The solar power operated computer according to claim 1, wherein said first and second solar cell assemblies are each covered with a transparent protective covering.

* * * * *